G. L. KENNEDY.
FLUID PRESSURE REGULATING GAGE
APPLICATION FILED FEB. 1, 1910.
1,079,600.
Patented Nov. 25, 1913.
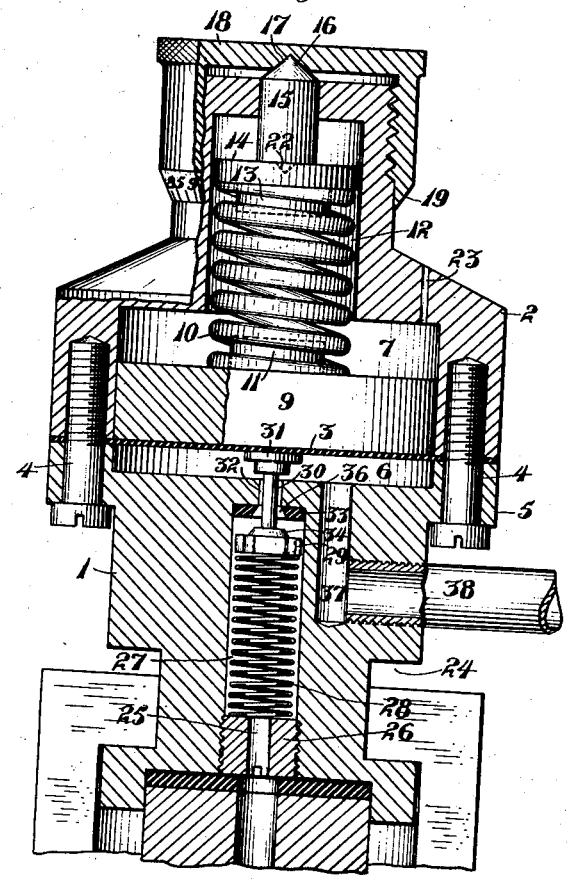
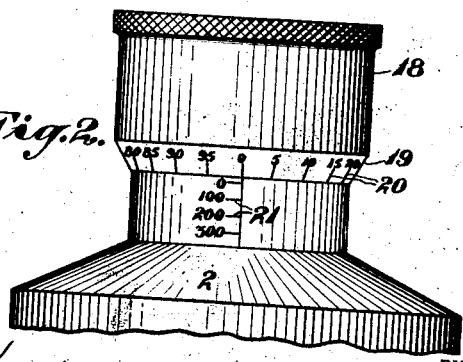
WITNESSES:
INVENTOR
ATTORNEY

UNITED STATES PATENT OFFICE.

GUY L. KENNEDY, OF SAN FRANCISCO, CALIFORNIA, ASSIGNOR TO NATIONAL CARBONATED LIQUID COMPANY, OF SAN FRANCISCO, CALIFORNIA.

FLUID-PRESSURE-REGULATING GAGE.

1,079,600. Specification of Letters Patent. Patented Nov. 25, 1913.

Application filed February 1, 1910. Serial No. 541,215.

*To all whom it may concern:*

Be it known that I, GUY L. KENNEDY, a citizen of the United States, residing at San Francisco, in the county of San Francisco and State of California, have invented new and useful Improvements in Fluid-Pressure-Regulating Gages, of which the following is a specification.

This invention relates to fluid pressure regulators of that type including a diaphragm-opened valve that controls the pressure of the fluid passing through the regulator.

The invention has for an object to improve and simplify the construction and operation of apparatus of this character so as to be reliable and efficient in use, composed of comparatively few parts, and so designed as to be extremely sensitive in operation.

Another object of the invention is the provision of a regulator having a controlling valve that is located in the inlet passage and is movable axially thereof so that the energy of the flowing fluid creates a thrust on the valve that tends to seat the same, the seating of the valve being opposed by the spring-tensioned diaphragm of the regulator.

A further object of the invention is to provide a novel valve which merely bears against and is not connected with the diaphragm so that excessive strain will not be brought to bear on the valve or its seat when the increasing pressure on the diaphragm moves the latter in the direction to permit the valve to close.

Another object is the employment of simple, effective and novel means for adjusting the set of the tensioning or weighting spring of the diaphragm.

With these objects in view and others, as will appear as the description proceeds, the invention comprises the various novel features of construction and arrangement of parts which will be more fully described hereinafter and set forth with particularity in the claims appended hereto.

In the accompanying drawing, which illustrates one embodiment of the invention, Figure 1 is a central vertical section of the pressure regulator with certain parts shown in elevation. Fig. 2 is an enlarged view of the upper end of the regulator showing the micrometer adjusting means for the diaphragm spring.

Similar reference characters are employed to designate corresponding parts throughout the views.

Referring to the drawing, the casing of the regulator consists of two sections 1 and 2, of suitable design to inclose a chamber that is separated by a rubber or other equivalent diaphragm 3 into a fluid pressure chamber 6 and a piston chamber 7. The peripheral portion of the diaphragm is clamped between the sections 1 and 2 of the casing, said sections being fastened together by bolts or screws 4 that pass through the flange 5 of the section 1 and screw into the section 2, whereby a fluid-tight joint is obtained between the sections. In the upper chamber 7, which is preferably cylindrical, is a piston 9 which is of substantially the same area as the portion of the diaphragm that is exposed to fluid pressure, the piston forming a support or backing for the diaphragm. Pressing on the diaphragm is a helical spring 10 which has one end fitted around a stud 11 on the piston. This spring is disposed axially of the piston and extends into a tubular extension 12 or neck on the section 2 of the casing. In this chamber 12 is a movable abutment 14 for the upper end of the spring 10. This abutment is in the form of a disk that has a centering stud 13 that extends into the upper end of the spring.

Bearing on the upper side of the abutment 14 is an adjusting stem or pin 15 that slides through an opening in the top of the chamber 12 so that the said top forms a guide for the stem 15, the said stem extending out of the top of the casing. Screwed on the tubular extension 12 is a cap 18 that bears on the upper end of the stem or pin 15 so as to regulate the position of the abutment 14 and hence the tension of the spring 10. The opposing members 14 and 18 between which the pin 15 is held have alining recesses 22 and 17, the former of which is shallower than the latter and the pin 15 has a conical point 16 at one end and is blunt at the other end. The pin 15 can be reversed so that the pointed end will engage in either recess or seat 22 or 17 so as to thereby vary the effective length of the pin, with the result that the distance between the cap 18 and abutment 14 can be changed. This reversal of the pin 15 serves to lengthen the range of adjustment of the spring 10 by the cap 18. In other words, the cap 18 can, by its rotary movement, adjust the tension of the valve within prescribed limits, and when a further adjustment is desired, the cap can be taken off, the pin 15 reversed, and the cap restored, with the result that the spring can be adjusted through a wider range. In order to regulate the set of the spring to a nicety, a micrometric gage is provided, as shown in Fig. 2. The cap 18 has a beveled end 19 which is divided peripherally from 0 to 100 in fifths, and coöperating with this annular scale is a vertical index line that forms a part of the scale 21, the latter scale being divided by hundreds. Thus by turning the cap 18, the pressure in ounces, pounds or other denominations can be read from the two scales 20 and 21 in the same manner as an ordinary micrometer. With the construction thus described, the diaphragm 3 and piston 9 will pulsate with the variations in pressure of the fluid acting on the diaphragm, and in order to permit free movement of the piston 9, the chamber 7 is open to the atmosphere through a pressure equalizing port 23.

In the section 1 of the casing is a peripheral groove 24 by which a coupling device can be engaged with the casing of the pressure regulator for connecting the latter with a container of fluid under pressure, the outlet of such container being partially shown in Fig. 1. Arranged in line with the bore of the outlet of the container is an opening 25 formed in a plug 26 that is adjustable in the central passage 27 formed in the section 1 of the casing. This plug 26 forms an adjustable abutment or seat for one end of a relatively light helical spring 28 on which rests the controlling valve. This controlling valve consists of a head or enlargement 29 that is connected by a slender stem 30 with an enlargement or head 31 that bears centrally on the diaphragm 3 but is not mechanically connected therewith. The stem 30 slides freely through a port 32 between the inner end of the passage 27 and diaphragm chamber 6, and it will be noted that this stem is smaller in diameter than the port 32 so that the fluid can pass readily into the chamber 6. A seat 33 of rubber or other suitable material is arranged against the shoulder formed between the inner end of the passage 27 and port 32, and in this seat is a conical opening 36 in which enters a conical projection 34 on the valve 29. In the construction shown and described, it will be noted that the valve is confined between the spring 28 on one side and the diaphragm 3 and spring 10 on the other side and it floats to and from open position without the need of a guide, so that there is no friction at the valve. The axes of the piston spring 10, spring 28 and valve, are in alinement, so that there exists no lateral strain tending to throw the valve to one side or the other, where its stem would rub on the port 32. Another feature characteristic of the arrangement of the parts is that the fluid flowing through the regulator passes in a straight line and as the result the *vis viva* of the moving fluid creates a considerable thrust on the valve that tends to seat the same. By utilizing the energy of the fluid in this manner, only a relatively light spring 28 is required for the valve. The full force of the fluid is obtained by reason of the fact that the bore of the outlet of the fluid container, the bore 25 in the plug 26, and passage 27, are axially in alinement with each other and with the valve, which latter closes in the direction in which the fluid is acting thereon. The chamber 6 has an outlet by means of a passage 37 leading downwardly therefrom, which passage communicates with an outlet pipe 38 that screws into the side of the section 1 of the casing. The entire volume of fluid passing through the post 32 acts on the diaphragm so that any variation in the pressure of the fluid delivered from the regulator affects the position of the piston 9 and in turn the position of the valve 29. By reason of this, the regulator is quick acting and extremely sensitive. Since the valve is not mechanically connected with the diaphragm, the latter can have a greater range of movement than the valve itself under excessively high pressure of fluid in the chamber 6, the advantage of this being that destructive strain on the valve and its seat is avoided, as would be the case if the valve were mechanically connected with the diaphragm and piston.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claims appended hereto.

Having thus described the invention, what I claim is:—

1. A pressure regulator including a chamber, an inlet for the chamber, an outlet for the chamber, a valve controlling the fluid admitted to the chamber, a diaphragm acting on the valve and responsive to variations in fluid pressure in the chamber, an adjustable tensioning means for the diaphragm, a rotary element for adjusting the said means within a given range, and a device reversibly mounted between the means and element to change the range of adjustment of the said means.

2. A pressure regulator including a chamber, an inlet for the chamber, an outlet for the chamber, a valve controlling the fluid admitted to the chamber, a diaphragm acting on the valve and responsive to variations in fluid pressure in the chamber, an adjustable tensioning means for the diaphragm, a rotary element for adjusting the said means within a given range, a device reversibly mounted between the means and element to change the range of adjustment of the said means, and a fixed guide through which the said device slides.

3. A pressure regulator including a chamber, an inlet for the chamber, an outlet for the chamber, a valve controlling the fluid admitted to the chamber, a diaphragm acting on the valve and responsive to variations in fluid pressure in the chamber, an adjustable tensioning means for the diaphragm, a central stem engaging the said means and reversible with respect thereto, and an element threaded to the casing and operating through the stem to adjust the tension of the said means.

4. A pressure regulator including a chamber, an inlet for the chamber, an outlet for the chamber, a valve controlling the fluid admitted to the chamber, a diaphragm acting on the valve and responsive to variations in fluid pressure in the chamber, an adjustable tensioning means for the diaphragm, a central stem engaging the said means and reversible with respect thereto, and a cap threaded on the casing and engaging the said stem, one end of the stem being blunt and the other end being pointed and the cap having a seat for receiving the said pointed end.

5. In a pressure regulator comprising a valve controlling diaphragm responsive to fluid pressure, a casing inclosing the diaphragm, a spring acting on the diaphragm, a member forming an abutment for the spring, a rotary spring adjusting member threaded to the casing, and a pin interposed between the members and axially engaging the adjusting member, said pin being reversible and so related to the members as to increase or diminish the distance between the members when the pin is reversed.

6. In a pressure regulator comprising a valve controlling diaphragm responsive to fluid pressure, a casing inclosing the diaphragm, a spring acting on the diaphragm, a member forming an abutment for the spring, a rotary spring adjusting member threaded to the casing, a pin interposed between the members and axially engaging the adjusting member, said pin being reversible and so related to the members as to increase or diminish the distance between the members when the pin is reversed, and a guide on the casing through which the pin slides and engaging an intermediate portion of the pin to prevent lateral displacement thereof.

In testimony whereof I have hereunto set my hand in the presence of two subscribing witnesses.

GUY L. KENNEDY.

Witnesses:
   FRANCIS M. WRIGHT,
   D. B. RICHARDS.